United States Patent
Belman

(10) Patent No.: US 9,719,261 B2
(45) Date of Patent: Aug. 1, 2017

(54) ASSISTANCE DEVICE FOR ALLOWING A WHEELED VEHICLE TO PASS OVER AN OBSTACLE

(71) Applicant: MYD"L", St. Denis (FR)

(72) Inventor: Pierre Belman, St. Denis (FR)

(73) Assignee: MYD"L", St. Denis (FR)

( * ) Notice: Subject to any disclaimer, the term of this patent is extended or adjusted under 35 U.S.C. 154(b) by 0 days.

(21) Appl. No.: 15/033,918

(22) PCT Filed: Nov. 3, 2014

(86) PCT No.: PCT/FR2014/052785
§ 371 (c)(1),
(2) Date: May 3, 2016

(87) PCT Pub. No.: WO2015/063432
PCT Pub. Date: May 7, 2015

(65) Prior Publication Data
US 2016/0273226 A1    Sep. 22, 2016

(30) Foreign Application Priority Data

Nov. 4, 2013 (FR) ..................... 13 60800

(51) Int. Cl.
*E04F 11/06* (2006.01)
*E04F 11/00* (2006.01)
*F16H 19/04* (2006.01)

(52) U.S. Cl.
CPC ............ *E04F 11/002* (2013.01); *F16H 19/04* (2013.01); *E04F 2011/005* (2013.01)

(58) Field of Classification Search
CPC ........................... E04F 2011/005; E04F 11/06
(Continued)

(56) References Cited

U.S. PATENT DOCUMENTS 5,636,399 A    6/1997  Tremblay et al.
6,109,395 A *  8/2000  Storm ................... B66B 9/0869
                                              187/200
(Continued)

FOREIGN PATENT DOCUMENTS

FR    2 947 224    * 12/2010
FR    3 016 149    *  7/2015
(Continued)

OTHER PUBLICATIONS

Abstract of European Patent—EP1034765, Sep. 13, 2000, 1 page.
(Continued)

*Primary Examiner* — Gary Hartmann
(74) *Attorney, Agent, or Firm* — Dority & Manning, P.A.

(57) ABSTRACT

An assistance device (1) to allow a wheeled vehicle to overcome an obstacle, comprising a frame, (2), an upper plate (4), a lower plate (3) with lateral rims (41), a flap (5) and a locking member (71; 72). The upper plate (4) is supported on the lateral rims (41). By moving in translation between a deployed position and a storage position, the lower plate (3) mechanically determines the height position of the upper plate (4) by sliding on the lateral rims (41). The flap (5) pivots relative to the upper plate (4) between a substantially vertical rest position and a deployed position resting on the lower plate (3). The flap (5) forms a junction between the lower plate (3) and the upper plate (4). The locking member (71; 72) is supported by the lateral rims (41) and locks the flap (5) in the storage position of the lower plate (3) and releases the flap (5) when the lower plate (3) leaves the storage position of same.

13 Claims, 8 Drawing Sheets

(58) Field of Classification Search
USPC .................................. 14/71.1, 71.3; 414/921
See application file for complete search history.

(56) References Cited

U.S. PATENT DOCUMENTS

| | | | | | |
|---|---|---|---|---|---|
| 6,601,677 | B1* | 8/2003 | Storm | ................... | B66B 9/0869 187/200 |
| 8,250,693 | B1* | 8/2012 | Johnson | ................... | B60P 1/433 14/71.1 |
| 8,359,691 | B2* | 1/2013 | Morris | ................... | A61G 3/061 14/71.3 |
| 8,505,141 | B1* | 8/2013 | Morris | ................... | A61G 3/061 14/71.1 |
| 8,631,529 | B1* | 1/2014 | Johnson | ............... | B66B 9/0869 14/71.3 |
| 8,739,342 | B1* | 6/2014 | Johnson | ............... | B66B 9/0869 14/71.3 |
| 8,813,290 | B1* | 8/2014 | Morris | ................... | E04F 11/002 14/71.3 |
| 8,832,893 | B1* | 9/2014 | Morris | ..................... | B66B 9/08 14/71.3 |
| 8,887,337 | B1* | 11/2014 | Morris | ................... | E04F 11/002 14/71.1 |
| 8,918,939 | B1* | 12/2014 | Morris | ................... | E04F 11/002 14/71.1 |
| 8,925,131 | B1* | 1/2015 | Morris | ................... | E04F 11/002 14/71.3 |
| 8,943,631 | B1* | 2/2015 | Morris | ..................... | B66B 9/08 14/71.3 |
| 9,045,908 | B1* | 6/2015 | Morris | ................... | E04F 11/002 |
| 2006/0245883 | A1 | 11/2006 | Fontaine et al. | | |

FOREIGN PATENT DOCUMENTS

| | | | |
|---|---|---|---|
| FR | 3 020 081 | * | 10/2015 |
| WO | WO 98/06370 | | 2/1998 |

OTHER PUBLICATIONS

Abstract of French Patent—FR2944955, Nov. 5, 2010, 1 page.
International Search Report for PCT/FR2014/052785, dated Feb. 9, 2015, 3 pages.

* cited by examiner

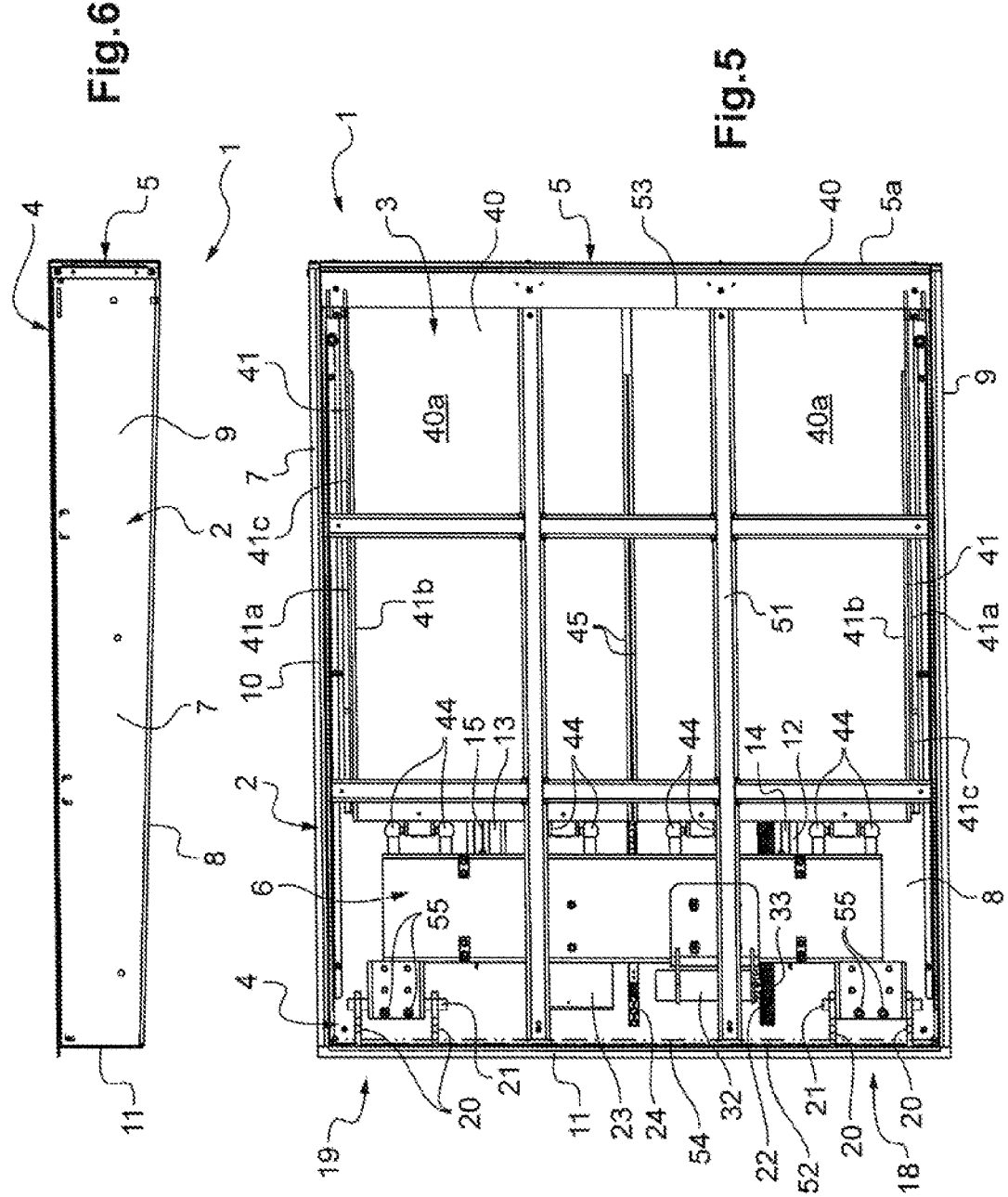

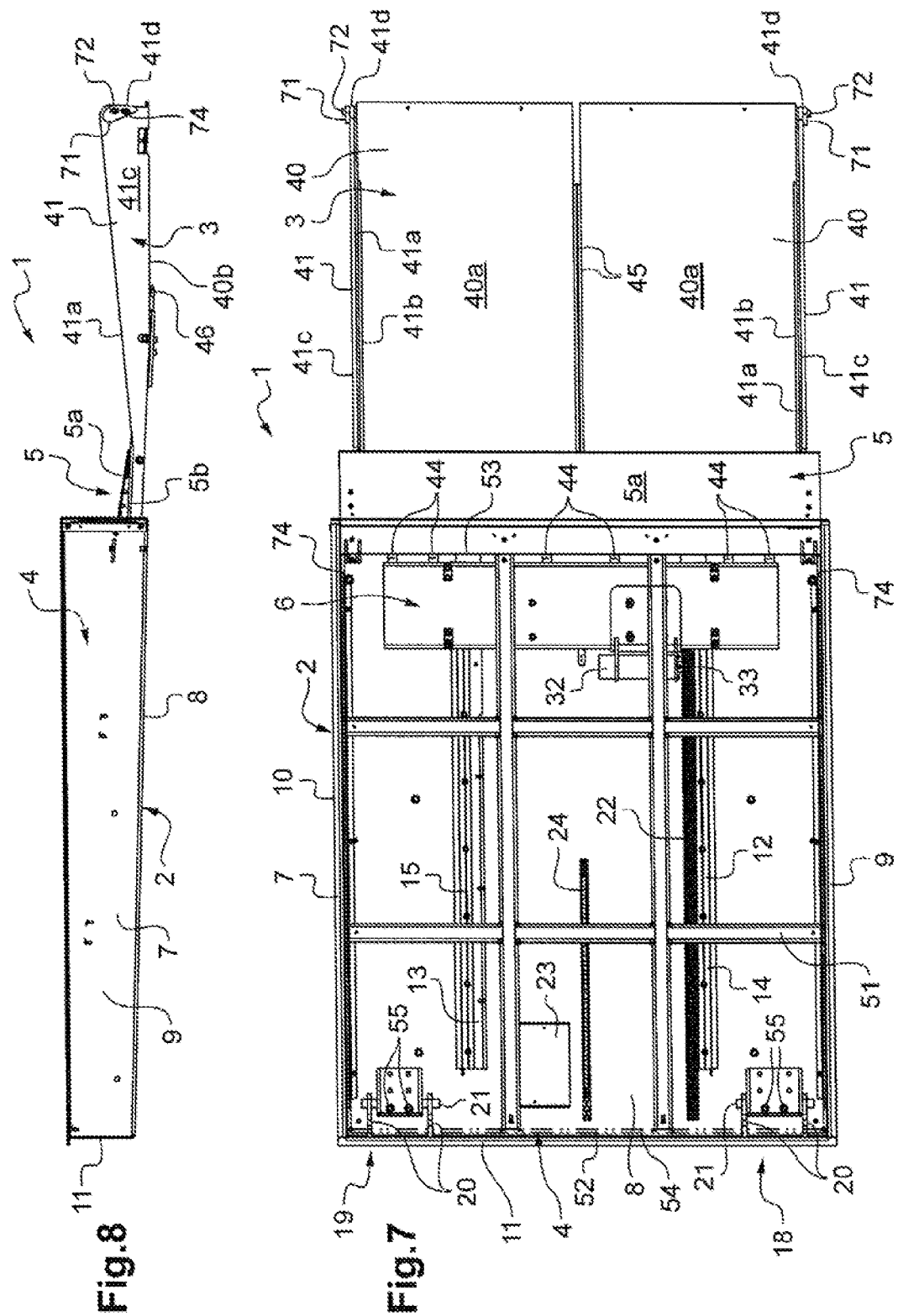

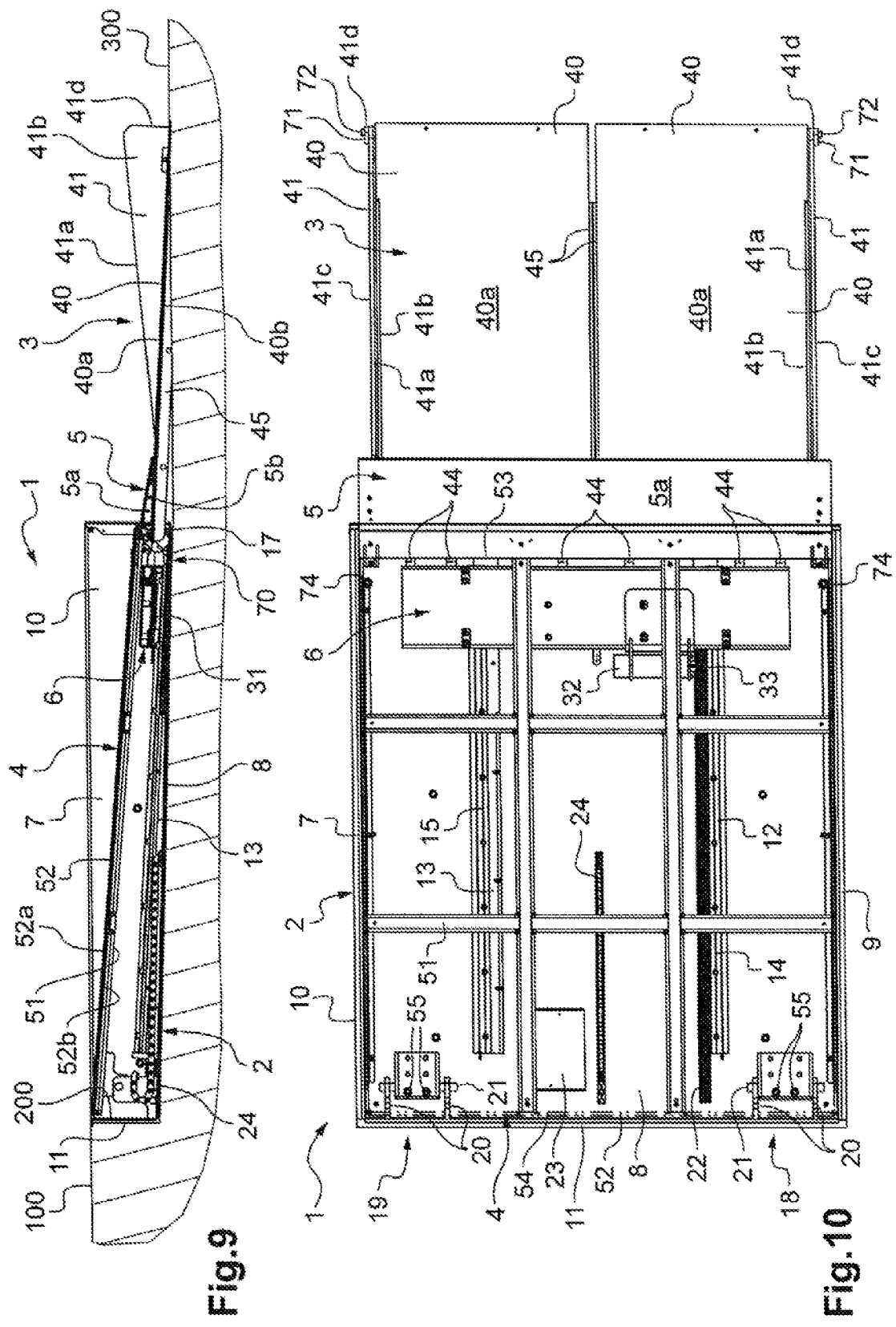

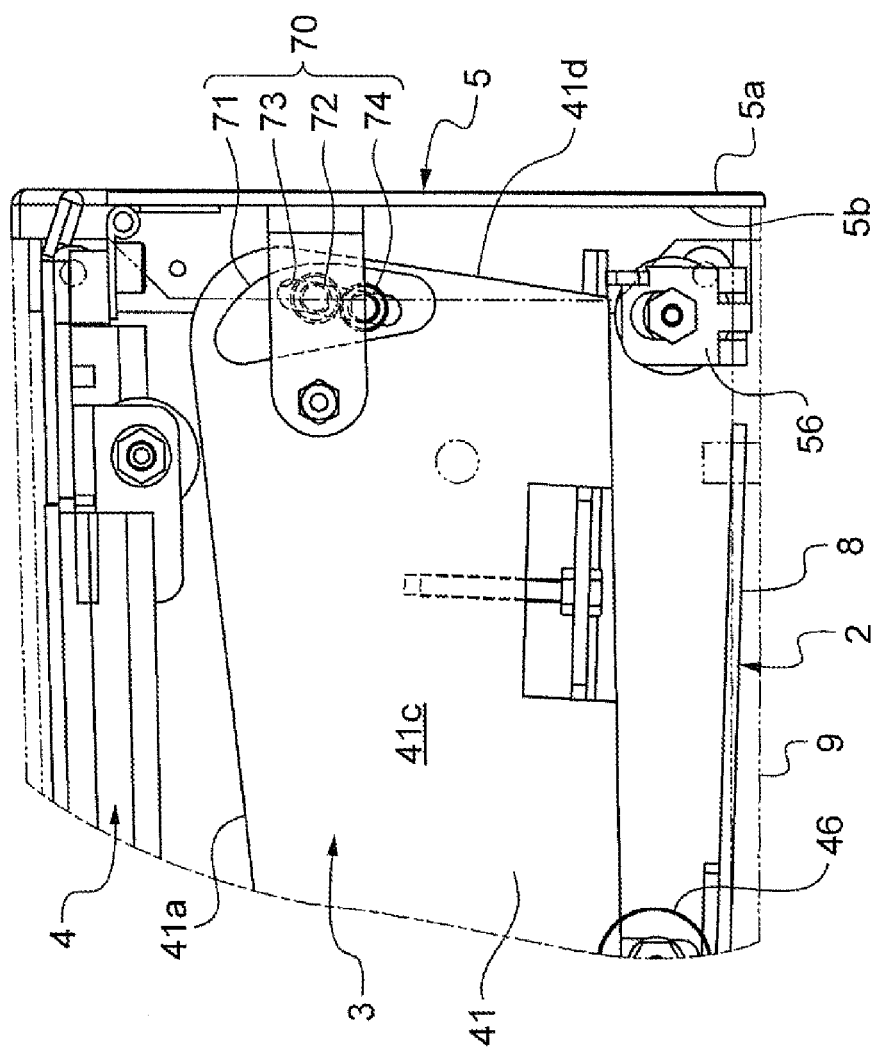

ASSISTANCE DEVICE FOR ALLOWING A WHEELED VEHICLE TO PASS OVER AN OBSTACLE

CROSS REFERENCE TO RELATED APPLICATION

This application is the national stage entry of International Patent Application No. PCT/FR2014/052785 having a filing date of Nov. 3, 2014, which claims priority to and the benefit of French Patent No. 1360800 filed in the French Intellectual Property Office on Nov. 4, 2013, the entire contents of which are incorporated herein by reference.

FIELD

The present invention relates to an assistance device for allowing a vehicle to pass over a step or a threshold, notably for people with reduced mobility who travel with the aid of a wheelchair or for people moving a wheeled trolley intended for transporting objects.

BACKGROUND

The applicant's FR 2 947 224 was pioneering in the field, well before the enactment of standards requiring access to all public buildings for people with reduced mobility. The key requirement of a lack of permanent encroachment onto the public thoroughfare is identified therein, as is as little encroachment as possible in the deployed position.

Proceeding from this prior art, the applicant has identified several needs to be met, notably the discretion of the device, which makes it desirable for it to be provided with the same covering as the surrounding ground surface, notably tiling. The need has also arisen to improve the leaktightness of the device in the event of bad weather while benefiting from a robust mechanical architecture and withstanding improper use and acts of vandalism.

The existing devices are not satisfactory.

The invention aims to improve the situation.

BRIEF DESCRIPTION

The invention proposes an assistance device for people with reduced mobility, notably for allowing a wheeled vehicle to pass over an obstacle, comprising:
 a stationary frame,
 a vertically movable upper plate,
 a lower plate that is mounted for translational movement along an inclined axis with respect to the horizontal between a rest position under the upper plate and a deployed position, the lower plate comprising a body and two raised lateral edges that are disposed along planes parallel to said axis, each raised lateral edge comprising an upper surface, the upper plate being supported at least in part on said raised lateral edges, the deployed position of the lower plate mechanically determining the vertical position of the upper plate, said raised lateral edges also forming a guide for moving the vehicle onto and aligning it on the lower plate,
 a flap that is mounted so as to pivot mechanically on the upper plate about a substantially horizontal axis perpendicular to the axis of translational movement of the lower plate, said flap being able to pivot between a substantially vertical rest position and a deployed position resting on the lower plate, said flap forming a junction between the lower plate and the upper plate, said flap being pivoted by said raised lateral edges at least over a part of its pivoting travel, and
 a mechanical member for locking the flap in the rest position, said mechanical locking member being supported on said raised lateral edges and being passive with respect to said raised lateral edges, locking said flap in the rest position of the lower plate and releasing said flap when said lower plate leaves its rest position.

Thus, the locked flap protects the assistance device from malevolent actions while being mechanically passive and having an outer surface with a double function for rolling into the deployed position and for acting as a rain screen in the rest position. The lower plate moves along a rectilinear path until it reaches the deployed position, for example in contact with the lower ground surface, for example the roadway or sidewalk. The raised lateral edges stiffen the body, guide a vehicle that moves onto the device, support the upper plate, for example on the flap side, and determine the vertical position of the upper plate.

In one embodiment, the lower plate is connected to a motor that drives a pinion engaged with a rack fastened to the frame. This disposition is compact.

In one embodiment, the device comprises a crosspiece that rests on rails of the frame by way of sliding guides. The frame may comprise two rails. Each of these features improves the precision of guidance of the crosspiece. The rails may have a head with a circular section through more than 180°, preferably more than 240°. Such a circular section improves the guidance and reduces the risk of derailment.

In one embodiment, the device comprises a crosspiece that is connected to the lower plate by ball joints. The lower plate may have play with respect to the crosspiece, thereby adapting to the position and the shape of the sidewalk or roadway.

In one embodiment, the device comprises a crosspiece, said crosspiece bearing a motor that is able to move the lower plate. Thus, the motor can remain protected inside the assistance device, even when the lower plate is in the deployed position.

In one embodiment, a part of the body and each raised lateral edge are made of a single piece of folded sheet metal and the lower plate comprises at least one gusset plate fastened to a lower face of the body. The gusset plate increases the stiffness of the body. Preferably, the gusset plate is disposed in an offset manner with respect to elements disposed inside the frame, such as a rack, in order to reduce the overall height by interpenetration of profiles.

In one embodiment, the body of the lower plate comprises two substantially equivalent parts, each being connected to a raised lateral edge and being capable of a relative offset. The adaptation of the lower plate to the lower ground surface on which it rests in the deployed state is improved, in particular when this lower ground surface is uneven. Each part can bear a gusset plate away from the raised lateral edge. Thus, each part is stiffened. On the other hand, each part of the lower plate may be supported by at least two rollers attached to the frame. The stability of each part of the lower plate is improved.

In one embodiment, the lower plate has a lower face provided with a wheel that is intended to press against the lower ground surface in the vicinity of the deployed position. The lower plate, in the deployed position and at the end of deployment, is supported by the ground surface, thereby reducing the cantilever.

In one embodiment, the raised lateral edges slide under the flap during the translational movement of the lower plate, the flap comprising a lower face that is able to come into contact with a pusher of the lower plate and is able to come into contact with the raised lateral edges. At the start of the deployment travel, the movable flap is pushed by the end of each raised lateral edge of the lower plate. The pivoting of the flap during deployment results in the lower plate being advanced. Such a configuration does not have a complex transmission system. Reliability is improved.

In one embodiment, in the rest position, the flap takes up at least a part of the weight from the upper plate and transmits said weight to the frame. The lower plate is spared. The stresses undergone in the stowed position are reduced.

In one embodiment, the upper plate is supported at least in part on the raised lateral edges by at least one wheel in contact with the upper surface of a raised lateral edge. Thus, the profile of the upper surface of the raised lateral edge and the translational position of the lower plate determine the vertical position of the upper plate, at least in the vicinity of the wheel of the upper plate. The sliding of the upper plate bearing against the lower plate is rendered easier. Wear is limited and controlled.

In a variant of this embodiment, the upper surface of the raised lateral edge is substantially planar transversely. The wheel is provided with a planar rolling surface. Thus, in the case of a slight misalignment of the lower plate with respect to the upper plate, for example on account of the lower ground surface being uneven, the contact zone does not have any stress concentration.

In one embodiment, the upper plate is supported at least in part on the raised lateral edges by at least one runner in contact with the upper surface of a raised lateral edge. Thus, the profile of the upper surface of the raised lateral edge and the translational position of the lower plate determine the vertical position of the upper plate, at least in the vicinity of the runners of the upper plate. The sliding of the upper plate bearing against the lower plate is rendered easier. Wear is limited and controlled.

In a variant of this embodiment, the upper surface of the raised lateral edge is substantially planar transversely. The runner is provided with a planar sliding surface. Thus, in the case of a slight misalignment of the lower plate with respect to the upper plate, for example on account of the lower ground surface being uneven, the contact zone does not have any stress concentration.

In one embodiment, the upper plate is provided with a substantially horizontal pivot pin disposed on the opposite side from the flap. The upper plate may comprise one or two flanges articulated on the frame. The upper plate thus has a substantially constant vertical position that is adapted to the higher ground surface, for example the ground surface of a public institution, on the side of the pivot pin. On the opposite side, the upper plate has a vertical position which follows the height of the raised lateral edges of the lower plate depending on the rectilinear translational movement of the lower plate. The lower plate has an edge flush with the level of the lower ground surface, for example a sidewalk, and an edge disposed under the flap in the deployed position.

In one embodiment, the vertical position of the upper plate is adjustable by at least two screws. The adaptation of the device to the height of the obstacle, for example a step, and to the form of the low ground surface, is quick and easy. It may also be adapted following the installation of the assistance device so as to match the surrounding ground-surface coverings. In addition, the horizontality of the upper plate can be selected with precision and adapted as desired.

In one embodiment, the flap is provided with a latch that acts at the end of the deployment travel, cooperating with a pusher of complementary shape that is supported by the raised lateral edge of the lower plate.

In one embodiment, the device comprises a cam that is supported by said raised lateral edges and is passive with respect to said raised lateral edges, said cam guiding the flap when the lower plate leaves its rest position or returns to its rest position, the mechanical member for locking the flap and the cam each comprising a screw, the heads of which are tangential to one another. The mechanical locking member and the cam are thus less prone to accidental unscrewing on account of vibration.

In each of the embodiments described above, the position of the upper plate is indexed mechanically with the position of the lower plate, producing a rectilinear travel from the stowed position to the deployed position and from the deployed position to the stowed position.

Depending on the presence of the preceding optional features, each raised lateral edge of the lower plate forms a rolling/sliding strip for each lateral wheel/runner of the upper plate, a flap opener, a member for immobilizing the flap in the closed position and an upper flap height index.

Further features and advantages of the invention will become apparent from studying the following detailed description and the appended drawings, in which:

BRIEF DESCRIPTION OF THE DRAWINGS

FIG. 5 is a top view corresponding to FIG. 4;

FIG. 6 is a side view corresponding to FIG. 4;

FIG. 7 is a view similar to FIG. 5 of the assistance device for passing over an obstacle, in the deployed position;

FIG. 8 is a side view corresponding to FIG. 7;

FIG. 9 schematically illustrates a cross-sectional view on a central vertical plane of an exemplary assistance device for passing over an obstacle, in the deployed position, in its environment;

FIG. 10 is a top view corresponding to FIG. 9; and

FIG. 11 is a schematic depiction of an embodiment of a latch of an assistance device.

Figure 1:
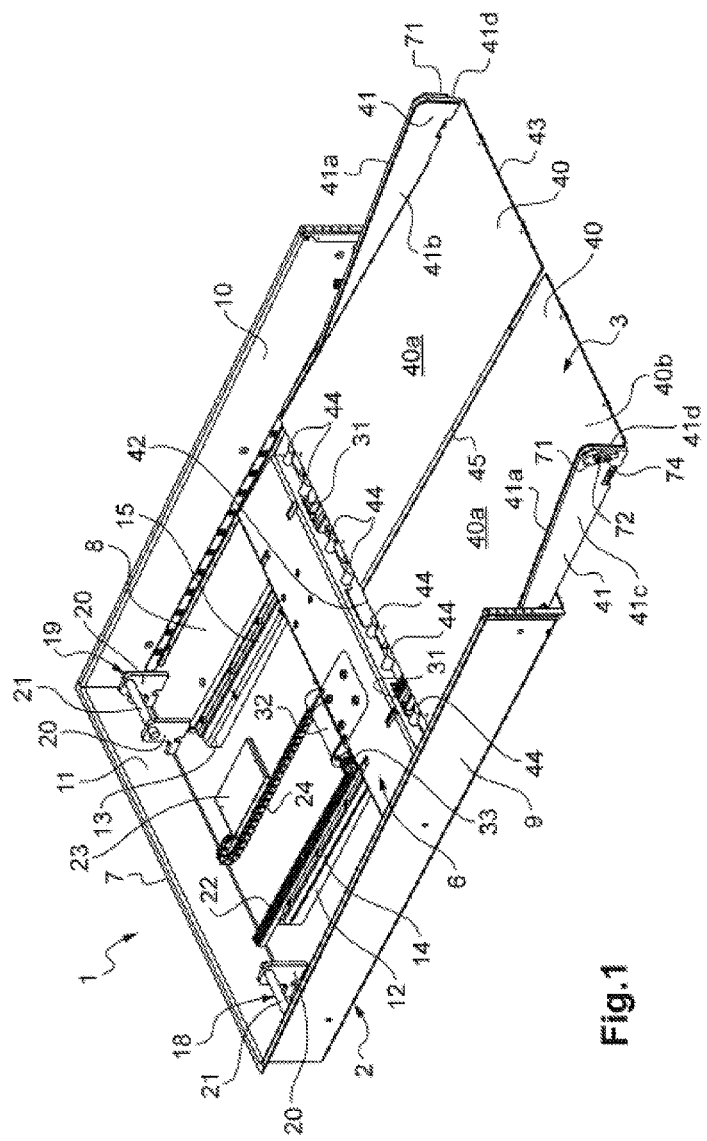
FIG. 1 schematically illustrates a perspective view of an example of a frame, lower plate and crosspiece of the assistance device for passing over an obstacle, in a semi-deployed position.

The appended drawings may be used not only to complement the invention but also to contribute to defining it, as necessary.

DETAILED DESCRIPTION

The aim of the invention is to make it possible to pass over a difference in level embodied as a step. In the following text, the two levels will be distinguished by the terms upper ground surface and lower ground surface. The entrance to a premises, a shop or an office frequently has a difference in height with respect to the outside, be it a street open to traffic, a pedestrian walkway, a square, etc. People who travel in a wheelchair have to be able to access this type of building. Delivery people who have dolly carts or trolleys have the same need, Heavy installations of the elevator type are not suitable for passing over a height of one or two steps. It is also necessary to respect the appearance of facades, which are often subject to conservation regulations, and their a alignment. The structure of the building has to be preserved as much as possible, notably the supporting structure for the upper ground surface of the ground floor in which entry should be easy. Furthermore, a notable constraint arises from the frequent lack of availability of the basement, which is used for other purposes or is held by third parties. The overall height should be limited.

To this end, the applicant has designed and developed an assistance system in the form of an erectable ramp housed in a box structure inserted into the upper ground surface of the premises in question. In the rest or stowed state, the ramp is retracted. The top of the box structure that forms a surface belonging to the upper ground surface of the premises in question has a selected appearance, for example one harmonized with the rest of the upper ground surface, and a suitable geometry, in general flush with the rest of the upper ground surface. The front face of the box structure has an appearance for integration into the facade of the building. The box structure can have a height of around 10 to 50 centimeters, allowing insertion into the majority of ground surfaces, for example into a concrete or brick slab of a building ground floor.

In the use or deployed state, the ramp protrudes from the facade. The ramp will bear against a portion of the ground surface situated in front of the premises. Said ground-surface portion is frequently a sidewalk or a roadway. Of course, the assistance system can be employed inside a building or even on a terrace. In the case of a building, the upper ground surface corresponds for example to the inside ground surface of the building and the lower ground surface corresponds to the sidewalk in front of the building. In the case of a terrace, the upper ground surface corresponds for example to the sidewalk accommodating the terrace and the lower ground surface corresponds to the roadway of the road in front of the terrace. The ramp provides a sufficiently cohesive rolling surface for a wheelchair, a trolley or a cart to pass over. The slope of the ramp is more accessible to rolling vehicles than an abrupt change in level.

In the embodiment illustrated in the figures, the assistance device 1 for people with reduced mobility has the overall shape of a rectangular parallelepiped allowing easy insertion into an upper ground surface 100 of a premises, in front of a lower ground surface 300, between which there is a step 200. The assistance device 1 comprises a frame 2, a lower plate 3 mounted for translational movement with respect to the frame 2, an upper plate 4 that is vertically movable with respect to the frame 2, a flap 5 for connecting the upper plate 4 and lower plate 3, and a latch 70.

Figure 2:
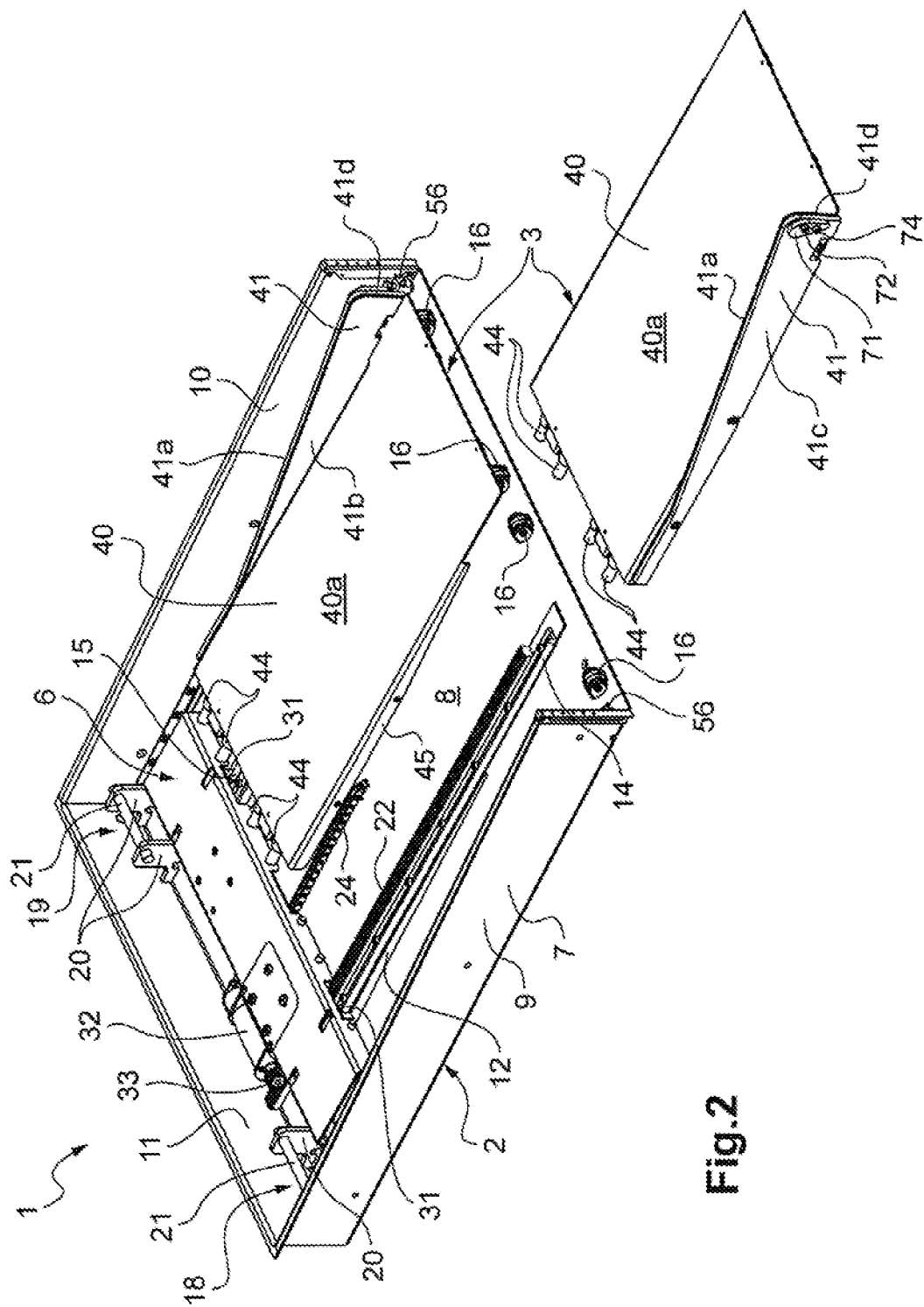
FIG. 2 is a view similar to FIG. 1, in the rest position, a part of the lower plate having been shown separately in order to reveal the frame.
Figure 3:
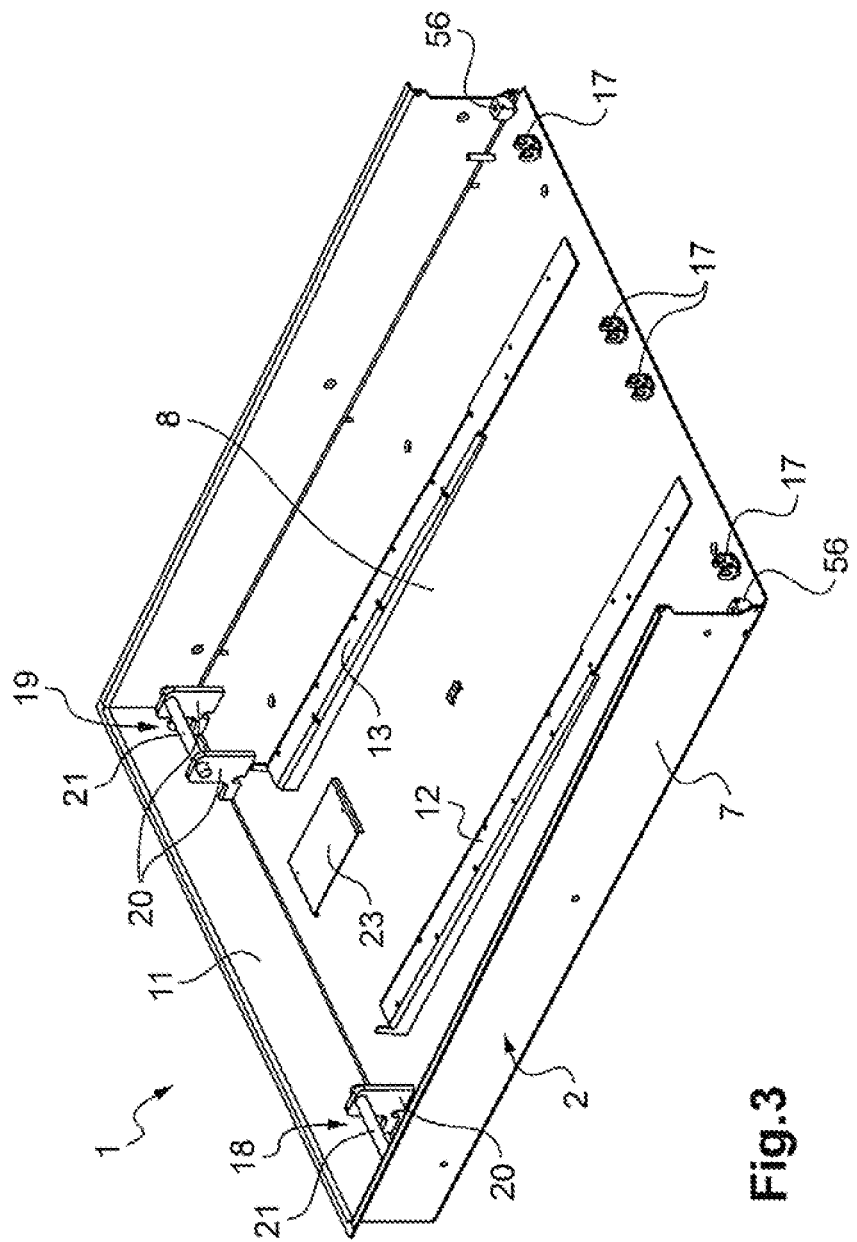
FIG. 3 schematically illustrates a perspective view of an example of a frame of an assistance device for passing over an obstacle.
Figure 4:
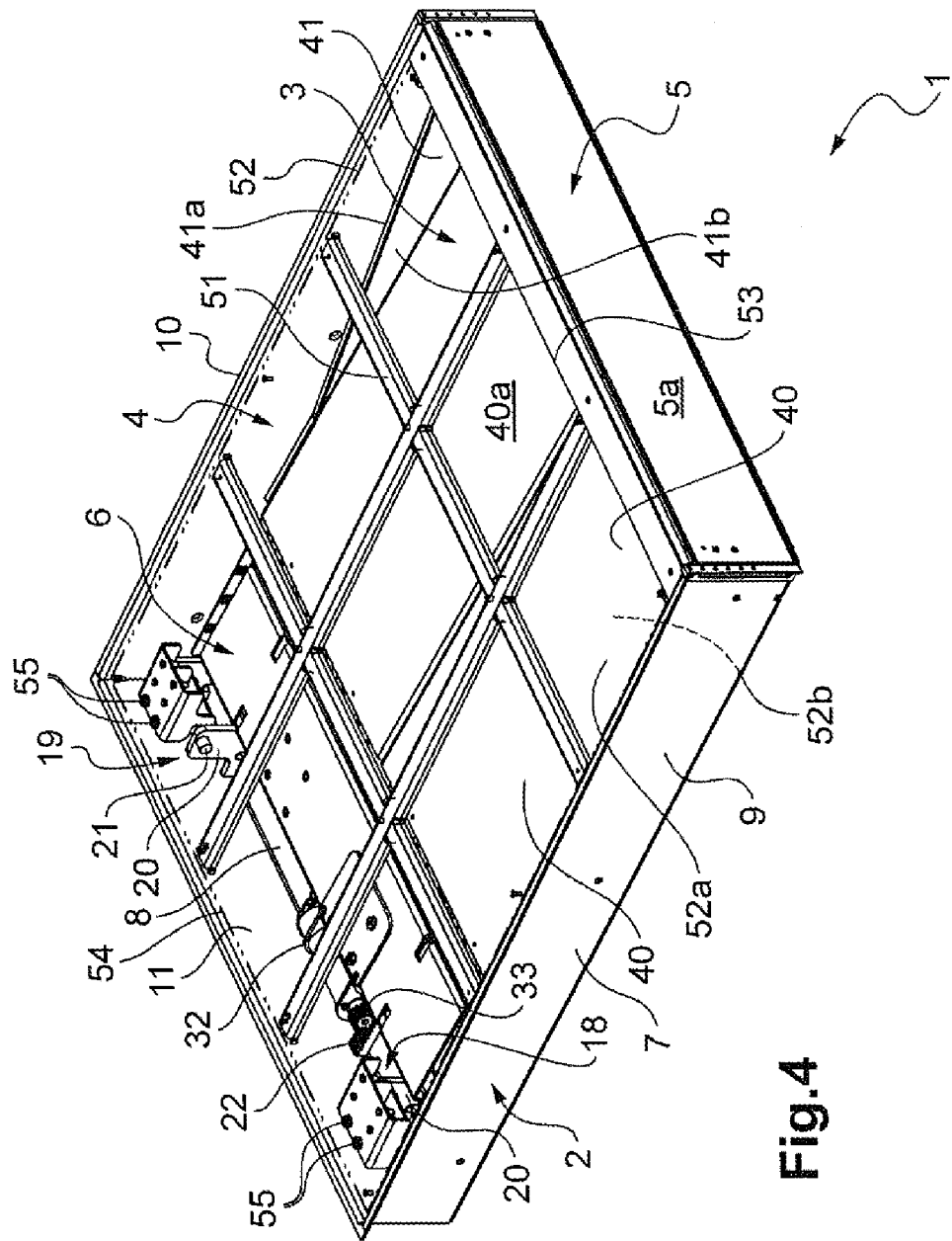
FIG. 4 schematically illustrates a perspective view of an example of an assistance device for passing over an obstacle, in the stowed position, the platform of the upper plate being shown by way of a dot-dash line.

In FIGS. 1 and 2, the upper plate 4 and the flap 5 have been omitted in order to make the underlying elements more visible. In FIG. 3, the lower plate 3, the upper plate 4 and the flap 5 have been omitted in order to reveal the interior of the frame 2. The assistance device 1 also comprises a crosspiece 6 that is capable of translational movement with respect to the frame 2.

The frame 2 is referred to as stationary in that it is intended to form an immovable casing of the assistance device 1 with respect to its installation environment such as the ground or the sidewalk. The frame 2 comprises a box structure 7 and support elements for the lower plate 3 and upper plate 4. The box structure 7 comprises a bottom 8, mutually parallel side walls 9, 10 and a rear wall 11. The term "rear" is used here in an arbitrary manner as opposed to the front of the assistance device 1 that is intended to be on the side of a lower ground surface 300, for example at the facade of the building. The term "rear" can also be seen as synonymous with "inside" in the case of a building. The rear wall 11 is perpendicular to the bottom 8. The rear wall 11 is perpendicular to the side walls 9, 10. The side walls 9, 10 are perpendicular to the bottom 8. The box structure 7 can be made of sheet steel. The front ends of the bottom 8 and of the side walls 9, 10 define a mouth of the box structure 7. During deployment, the lower plate 3 emerges from the box structure 7 through the mouth. The mouth is closed by the flap 5 in the stowed position.

As a general rule, the bottom 8 is mounted in a housing provided for this purpose in the upper ground surface 100 of the premises, being inclined slightly toward the outside, for example by about 1 to 3°. A slight inclination makes evacuation by gravity easier in the event of accidental infiltration of liquid into the box structure 7. Moreover, the depth of the housing to be hollowed out in order to house the assistance device 1 is reduced at the rear. The embodiment shown in the figures has such an inclination: in FIGS. 6, 8 and 9, the bottom 8 is inclined slightly toward the lower ground surface 300 while the upper edges of the side walls 9, 10 are horizontal in order to better match the surface of the upper ground surface 100. This explains the not exactly parallelepipedal appearance of the box structure 7. In order to facilitate understanding, this slight inclination will be ignored in the following text.

The frame 2 comprises ramps, in this case two similar ramps 12, 13. The ramps 12, 13 are fastened to the frame 2, in this case for example by being screwed to the bottom 8. The ramps 12, 13 extend parallel to one another and with respect to the side walls 9, 10. The ramps 12, 13 have a height that decreases from the rear of the assistance device 1 to the front. Their respective ends that are disposed at the front of the box structure 7 thus have a height of virtually zero, several centimeters from the front end of the box structure 7. The ramps 12 and 13 each have a planar upper surface. Each planar upper surface has a slope with respect to the bottom 8, corresponding to the variation in height of the ramps 12, 13. The slope defines the direction of translational movement of the lower plate 3. In this case, the slope is between −10 and 10°. The slope is added to the inclination of the bottom 8 with respect to the horizontal. For example, the slope with respect to the horizontal is 3.3° while the inclination of the bottom 8 with respect to the horizontal is around 2°.

The frame 2 also comprises rails, in this case two rails 14, 15, that are mounted on the ramps 12, 13, respectively, and support the lower plate 3 and the crosspiece 6. The rails 14, 15 are in this case in the form of profiled elements. The rails 14, 15 comprise a base in contact with the upper surface of the ramps 12, 13. The rails 14, 15 are secured to the frame 2. The rails 14, 15, which have in this case a constant profile and are disposed on the respective upper surfaces of the ramps 12, 13, extend in a direction parallel to the side walls 9, 10 at an angle with respect to the bottom 8 corresponding to the slope of the ramps 12, 13.

The profiles of the rails 14, 15 comprise, above the base, a head with a rounded shape. The head of the rails 14, 15 can have a circular profile through around three quarters of a turn and be connected to the base, see FIG. 2. In other embodiments, the rails have a head with a circular section over more than 180°, preferably more than 240°. Such a shape of the rails allows precise guidance of the crosspiece 6 during its movement. The rails 14, 15 can also have other shapes suitable for supporting the crosspiece 6, such as a domed or flat profile.

The frame 2 also comprises a plurality of rollers 16 mounted on side plates 17 fastened to the bottom 8 near the front end of the frame 2. There are four rollers 16 here, that provide support for the lower plate 3. The rollers 16 are mounted to turn freely so as to provide a non-driving, passive mechanical support function.

Near the rear wall 11, the frame 2 comprises two supports 18, 19 for the upper plate 4. Each support 18, 19 comprises a pin 21 supported by two side plates 20, or flanges. The side plates 20 are fastened to the bottom 8. The pins 21 extend substantially horizontally. The upper plate 4 pivots on the pins 21 near the rear wall 11. Thus, the rear end of the upper plate 4, close to the rear wall 11, is kept at a substantially constant height, apart from when pivoting, during the deployment/stowing of the assistance device 1. The front end of the upper plate 4 can move up or down as will be described below.

In the example described here, the frame 2 comprises a rack 22. The rack 22 is housed in the box structure 7, in this case fastened to the flat upper surface of one ramp 12 of the two ramps 12, 13, substantially along the corresponding rail 14. The rack 22 extends substantially parallel to the rails 13, 14. The teeth of the rack 22 are oriented upward here so as to mesh with a corresponding driven part, as will be described below.

The assistance device 1 comprises a power supply 23, in the form for example of a case. The power supply 23 is itself powered by a connection outside the assistance device 1, not shown in the figures. The case can also house an internal control member that is controlled from outside the assistance device 1 by a wired or wireless external control member known per se. The case is disposed in the box structure 7 of the frame 2, allowing the lower plate 3 and upper plate 4 to move freely. In this case, the case is disposed near the rear wall 11, such that the crosspiece 6 passes above the case at the end of a stowing operation. Alternatively, the power supply 23 can comprise a battery. In this case, it is possible to avoid an external connection. The battery can be provided so as to be exchangeable during maintenance and/or recharged, for example by an ancillary solar power system.

The assistance device 1 comprises, here, an unwindable track 24. The unwindable track 24 is housed in the box structure 7. The unwindable track 24 accommodates a power supply cable that connects the power supply 23 to a driving member described below. The unwindable track 24 makes it possible to guide the movement of the cable during the deployment/stowing operations of the assistance device 1 so as to avoid a situation in which the cable comes into contact with moving parts and causes malfunctions.

The crosspiece 6 has suitable dimensions for being housed in the box structure 7 of the frame 2 in a substantially transverse orientation, that is to say that the direction of the length of the crosspiece 6 is oriented substantially parallel to the bottom 8 and to the rear wall 11. In the example described here, the crosspiece 6 has a length less than the internal space of the frame 2 between the side walls 9, 10. The crosspiece 6 has a width of around 10 centimeters and a thickness of a few millimeters to a few centimeters. The direction of the width is oriented in the main direction of the rails 14, 15, while the direction of the thickness is oriented vertically, apart from the slope. Thus, the space requirement of the crosspiece 6 in the frame 2 is minimized.

The crosspiece 6 is configured to be supported by the rails 14, 15 as described above. Furthermore, the crosspiece 6 is configured to be guided by the rails 14, 15 and/or the ramps 12, 13 during its movements. To this end, the crosspiece 6 has sliding guides 31. In the example described here and visible in FIGS. 1 and 2, the sliding guides 31 are in the form of grooves provided in a lower surface of the crosspiece 6 and having a shape corresponding to the ramps 12, 13 and the rails 14, 15. The crosspiece 6 is thus guided in translational movement in the forward-rearward direction of the assistance device 1. The movements of the crosspiece 6 are limited in the horizontal direction perpendicular to the translational movement, that is to say the lateral direction.

In variants, the sliding guides 31 can comprise sliding runners and/or rollers that facilitate sliding on the rails 14, 15. The sliding guides 31 have shapes adapted to those of the rails 14, 15. In the case of profiles of the rails 14, 15 having a circular part, runners of the crosspiece 6 can surround the circular part through more than 180°. In this case, the translational movement is more precise and the risk of accidental derailment of the crosspiece 6 is reduced.

The assistance device 1 comprises a motor 32. The motor 32 is fastened to the crosspiece 6, for example by screwing. The motor 32 is powered by the power supply 23, in this case by way of the cable housed in the unwindable track 24. The motor 32 is arranged so as to engage with the rack 22. The activation of the motor 32 generates its movement along the rack 22 and consequently the substantially rectilinear movement of the crosspiece 6 with respect to the frame 2. At the same time, the unwindable track 24 follows the relative movement between the motor 32 and the frame 2.

In the example described here, the motor 32 is disposed in contact with a rear surface of the crosspiece 6. The motor 32 drives a toothed pinion 33, engaged with the rack 22. The pinion 33 is set in rotation by the motor 32 about a rotation axis substantially perpendicular to the rack 22. The motor 32 is equipped with a straight gearbox having planetary gearing so as to adjust the torque and the speed of rotation of the pinion 33. Such a configuration is very compact and takes up little space within the box structure 7. In the embodiment shown in the figures, there is only one motor 32, which is sufficient to generate the combined movements of deployment/stowing of the assistance device 1.

In the case of runners of the crosspiece 6 surrounding a circular part of the rails 14, 15 through more than 180°, the crosspiece 6 is pressed properly against the rails 14, 15 and the pinion 55 remains engaged properly with the rack 22.

The lower plate 3 comprises a body 40 and two raised lateral edges 41. The lower plate 3 is concealed under the upper plate 4 in the stowed state of the assistance device 1 and appears only during deployment. The body 40 has the overall shape of a planar plate intended to support the passage of a rolling vehicle in the deployed state of the assistance device 1. The body 40 has a rectangular overall shape with dimensions smaller than the internal space of the box structure 7 so as to be housed therein in the stowed state of the assistance device 1. The body 40 has an upwardly oriented upper face 40a that is visible in FIGS. 1 and 2, and a lower face 40b on the opposite side from the upper face 40a.

The body 40 has a rear edge 42 connected to the crosspiece 6 and a front edge 43 on the opposite side from the rear edge 42.

In the deployed position, the front edge 43 is intended to be in contact with the lower ground surface 300, so as to facilitate the climbing of a vehicle using the assistance device 1. For a user of such a vehicle, it is desirable for the front edge 43, which is the entry zone in the direction of climbing onto the upper face 40a, to be as thin as possible. To this end, the front edge 43 can be beveled. Moreover, the front edge 43 can be designed to be flush with, and preferably to bear against, the lower ground surface 300 in the deployed state. In the deployed state, the rear edge 42 and the crosspiece 6 to which it is connected remain in the internal space of the box structure 7, close to the front end of the box structure 7 and the mouth of the box structure 7.

The body 40 is supported on the rollers 16 at the front of the box structure 7. The body 40 is inclined slightly depending on the relative vertical position of the rollers 16 with respect to the rear edge 42 of the lower plate 3. The crosspiece 6 is situated in the box structure 7, close to the rear end of the box structure 7 in the stowed position.

In the stowed position, the crosspiece 6 is disposed in part above the power supply case 23 and the unwindable track 24. The front edge 43 is also housed in the box structure 7, slightly set back from the mouth and the front end of the box structure 7.

In the example shown in the figures, the rear edge 42 is connected to the front of the crosspiece 6 by way of ball joints 44. The lower plate 3 is thus fixed with respect to the crosspiece 6 in the direction of rectilinear movement of said crosspiece 6, but has freedom of movement of the front edge 43 with respect to the crosspiece 6 in the substantially vertical direction. The ball joints 44 allow rocking about the rollers 16 on which the lower plate 3 rests depending on its instantaneous position between the stowed position and the deployed position. This adjusts the vertical position of the lower plate 3 with respect to the lower ground surface 300, during movements and in the deployed position. When the motor 32 starts up, the movement of the crosspiece 6 along the rails 13, 14 drives a movement of the lower plate 3. Thus, during the stowing operation, the crosspiece 6 pulls the lower plate 3 across the mouth toward the inside of the box structure 7 in order to retract it into the latter. During the deploying operation, the crosspiece 6 pushes the lower plate 3 across the mouth at the front of the box structure 7 and toward the outside.

The two raised lateral edges 41 are in this case substantially symmetrical to one another with respect to a plane of symmetry corresponding to the plane of FIG. 9. The plane of symmetry is vertical and oriented in the forward-rearward direction. The two raised lateral edges 41 extend substantially perpendicularly and upwardly on each side of the body 40. Each raised lateral edge 41 can be secured to the body 40, for example by welding or screwing. Each raised lateral edge 41 can be in one piece with the body 40, for example obtained by bending a metal sheet. Each raised lateral edge 41 extends substantially parallel to the axis of translational movement of the body 40.

Each raised lateral edge 41 has an upper surface 41a that is oriented upward, an internal face 41b that is oriented toward the center of the lower plate 3, an external face 41c on the opposite side from the internal face 41b and a front surface 41d that is oriented toward the front and connected to the upper surface 41a by a rounded connecting fillet.

The upper surfaces 41a support the lower plate 4 throughout deployment and stowing, including in the deployed and stowed states. Each upper surface 41a supports the flap 5 during deployment/stowing. Consequently, the shape and the height of the raised lateral edges 41 and their respective upper surfaces 41a mechanically determine the position of the upper plate 4 and of the flap 5. During movements of the lower plate 3, the upper surfaces 41a undergo translational movement under the upper plate 4 and the flap 5.

In the embodiment shown in the figures, each raised lateral edge 41 has a triangular overall shape. Each raised lateral edge 41 has a great height, in this case around 5 to 50 centimeters, at the front end of the lower plate 3 and an apex at the rear end. In other words, the height of each raised lateral edge 41 and thus the position of the corresponding upper surfaces 41a increase from the rear to the front of the lower plate 3. During deployment, the distance between the bottom 8 of the box structure 7 and the portion of the upper surfaces 41a that is situated at the mouth of the box structure 7 decreases. Consequently, the part of the upper plate 4 resting on the upper surfaces 41a goes down with respect to the frame 2 at the mouth during deployment. This effect is reversed during the stowing operation. The deployed position of the lower plate 3 thus mechanically determines the vertical position of the upper plate 4.

In this case, the upper surfaces 41a are transversely planar. This makes it possible to reduce wear.

The internal faces 41b form a guide for driving a rolling vehicle onto and aligning it on the lower plate 3.

In the example described here, the lower plate 3 comprises a gusset plate 45 that protrudes downwardly from the lower face 40b of the body 40 and extends in the forward-rearward direction. The gusset plate 45 increases the stiffness of the body 40. The position of the gusset plate 45 in the lateral direction is selected here depending on the organization of the elements in the box structure 7, for example the rails 13, 14 and the rack 22. This selection is made so as to avoid any collision during stowing between the gusset plate 45 and the elements of the frame 2, without requiring any additional vertical space: by interpenetration of profiles, the gusset plate 45 fits between the elements contained in the box structure 7 during stowing.

One or more wheels 46 are furthermore disposed under the lower face 40b of the lower plate 3. Thus, at the end of deployment and in the deployed position, said wheels 46 bear against the lower ground surface 300. The front edge 43 of the lower plate 3 is then supported by the lower ground surface 300. The cantilever and the stresses that result therefrom are reduced.

In the embodiment in the figures, the lower plate 3 comprises two substantially equivalent parts, one of which is shown separately in FIG. 2. The two parts are substantially symmetrical to one another with respect to a vertical plane of symmetry that is oriented in the forward-rearward direction corresponding to the plane of FIG. 9. In other words, the body 40 is split in two. The two parts can thus have a relative offset, in particular vertically. This allows better adaptation to the lower ground surface 300 in the deployed position. Manufacturing is simplified. For some applications, the body 40 can be reduced down to two parts with small widths that are spaced apart from one another. This is suitable for example for the passage of vehicles that have pairs of wheels that are coaxial, or on axles, and the spacing apart of which is standard or within a known range. The lower plate 3 can thus be divided into more than two parts having independence of vertical movement.

In the case of a lower plate 3 in two or more parts, each part can be provided with a gusset plate similar to the gusset plate 45, preferably at a distance from the raised lateral edge 41, so as to improve stiffness. In order to improve stability, each of the parts of the lower plate 3 is supported here by at least two rollers 16 of the frame 2 that form a pair.

The upper plate 4 has a substantially planar and rectangular shape with dimensions suitable for moving up and down in the box structure 7.

In the example described here, the upper plate 4 comprises a framework 51, for example made of welded tubes, covered with a rectangular platform 52. The platform 52 is shown by way of a dot-dash line and transparently in FIGS. 4, 5, 7 and 10. The platform 52 has an upper face 52a and a lower face 52b on the opposite side from the upper face 52a.

The upper plate 4 optionally comprises raised edges. The raised edges can be formed by bending the sheet metal of the platform 52. The raised edges extend perpendicularly upward from the platform 52 and along the contour of the latter. The raised edges have a height selected to accommodate a ground covering to be applied to the upper face 52a of the platform 52 and matching the upper ground surface 100. The raised edges can for example be suitable for tiles, a flexible floor, etc. Alternatively, the platform 52 does not have a raised edge. The upper face 52a can have a nonslip surface or a surface for fastening an added ground covering.

The upper plate 4 has a front edge 53 and a rear edge 54 on the opposite side from the front edge 53.

The rear edge 54 is substantially aligned with the rear wall 11 of the frame 2 and flush with the level of the upper ground surface 100. A part of the upper plate 4 close to the rear edge 54 is mounted so as to pivot about the pins 21 of the chassis 2. The height of the rear end of the upper plate 4 is thus constant, apart from during pivoting. The upper plate 4 is also fixed in the forward-rearward direction with respect to the frame 2, apart from during pivoting.

The fastening of the upper plate 4 to the frame 2 by way of the pins 21 can be provided with a system for manually adjusting the height of the upper plate 4, for example by adjusting screws 55. Thus, the adjustment of the upper plate 4 to the level of the upper ground surface 100 can be carried out rapidly and practically during the installation of the assistance device 1 and/or a posteriori during the installation of a ground covering.

The upper plate 4 has lateral zones of the lower face 52b that are intended to bear against the upper surfaces 41a of the raised lateral edges 41 of the lower plate 3, as described above. Said zones are situated close to the front edge 53 and can extend along the length of the upper plate 4.

In one embodiment, the upper plate 4 comprises at least one wheel and/or runner disposed at the lower face 52b. The wheel, or the runner, has a rolling surface, or sliding surface, respectively, designed to roll/slide on the corresponding upper surface 41a forming a cam.

Thus, the profile of the upper surface 41a of the raised lateral edge 41 and the translational position of the lower plate 3 determine the vertical position of the upper plate 4, in the vicinity of the wheels/runners of the upper plate 4. By extension, the height of the rest of the upper plate 4, including the front edge 53, is also determined by the translational position of the lower plate 3. The upper plate 4 is thus vertically movable.

By pivoting, about the pins 21 of the frame 2, the slope of the upper plate 4 with respect to the frame 2 and to the horizontal is also defined by the translational position of the lower plate 3.

In the case of upper surfaces 41a of the lower plate 3 that are transversely planar, the rolling surface of the wheel, or the sliding surface of the runner, on the upper plate 4 is preferably planar.

The wheels/runners of the upper plate 4 in contact with the upper surfaces 41a of the lower plate 3 can be provided with a system for manually adjusting the height of the upper plate 4, for example by adjusting screws. Thus, the adjustment of the upper plate 4 to the level of the upper ground surface 100 in the stowed position of the assistance device 1 can be carried out rapidly and practically during the installation of the assistance device 1 and/or a posteriori during the installation of a ground covering. Such adjustment systems also make it possible to adjust the horizontality of the upper face 52a or, by contrast, a chosen inclination.

The flap 5 is connected to the upper plate 4 by the front edge 53 or in the immediate vicinity thereof.

The flap 5 has an elongate rectangular overall shape having suitable dimensions for closing the mouth of the box structure 7. The flap 5 has an external face 5a and an internal face 5b on the opposite side from the external face 5a.

The flap 5 is mounted so as to pivot mechanically under the upper plate 4 about a substantially horizontal axis perpendicular to the axis of translational movement of the lower plate 3. The axis of the pivot extends substantially along the front edge 53 of the upper plate 4. The flap 5 is able to pivot between a substantially vertical rest position when the assistance device 1 is in the stowed state and a deployed position resting on the lower plate 3 during and at the end of deployment.

In the closed state of the flap 5, the contour of the flap 5 is in contact or virtually in contact with the bottom 8 and the side walls 9, 10. In one embodiment, the lower plate 3 and the frame 2 are mutually configured such that the weight from the upper plate 4 is transmitted to the frame 2. Thus, the stresses applied to the lower plate 3 are reduced. The lower plate 3 is not involved. For this purpose, additional bearing zones are provided between the lower plate 3 and the frame 2 in the closed position. The additional bearing zones are carried here by cleats 56 which are fastened to the bottom 8 and against which the lower plate 3 bears, said lower plate 3 itself supporting the upper plate 4 in the stowed state of the assistance device 1.

In one embodiment, the contour of the flap 5 and/or the mouth of the box structure 7 is provided with a seal so as to ensure leaktightness. This makes it possible to protect the assistance device 1 from infiltrations, in particular when the external face 5a is, alone, exposed to the weather, for example at a threshold of a building that opens onto a public road. In another embodiment, a hole is maintained between the bottom 8 and the flap 5 so as to allow the evacuation of liquid from the inside to the outside of the box structure 7. This makes it possible to avoid the presence of stagnant water in the box structure 7.

At the start of deployment, the lower plate 3 is moved forward. The front surface 41d of each of the raised lateral edges 41 of the lower plate 3 bears against and then pushes lateral portions of the lower face 5b of the flap 5. The flap 5 leaves its vertical position and starts its pivoting travel. The upper plate 4 pivots about the pins 21 and the front edge 53 of the upper plate 4 moves down. The flap 5 then follows a movement made up of the lowering of its pivot axis and of pivoting outward. During the translational movement of the lower plate 3, the lateral portions of the lower face 5b of the flap 5 slide successively against the front surfaces 41d, the connecting fillets between the front surfaces 41d and the upper surfaces 41a, and then over the upper surfaces 41a of the raised lateral edges 41.

In the open state of the flap 5, at the end of deployment, the flap 5 forms a junction between the lower plate 3 and the upper plate 4, as shown in FIGS. 7 to 10. The lateral portions of the lower face 5b of the flap 5 bear against the rear ends of the upper surfaces 41a. In the example described here, the height of the raised lateral edges 41 is zero in a rear end portion of the lower plate 3. Consequently, the internal face 5b of the flap 5 bears, entirely or in part, against the rear end portion of the upper face 40a of the body 40 of the lower plate 3. The external face 5a of the flap 5 becomes a rolling surface for the vehicle using the assistance device 1 and provides the junction between the lower plate 3 and the upper plate 4.

FIG. 11 schematically shows the latch 70 in the locked state. The latch 70 comprises a pusher 71 secured to the lower plate 3 and fastened to the external face 41c of at least one raised lateral edge 41, a stud 72 forming a protrusion from the pusher 71 toward the outside and a corresponding housing 73 provided in the flap 5.

The pusher 71 and the stud 72 act as mechanical locking members that are supported by at least one of the raised lateral edges 41 and are passive with respect to said raised lateral edges 41. The pusher 71 and the stud 72 are visible for example in FIGS. 1, 2, 7, 8, 10 and 11. In the closed state of the flap 5, the stud 72 is positioned in the corresponding housing 73 in the flap 5 and in a locking position. In this locking position, the cooperation of the stud 72 and the housing 73 prevents the flap 5 from pivoting outward.

At the start of the movement of the lower plate 3, the movement of the pusher 71 (toward the right in FIG. 11) causes the flap 5 to pivot outward. The stud 72 exits the housing 73. The latch 70 leaves its locking position by a combination of a translational movement of the stud 72 and a pivoting movement of the flap 5.

At the end of the stowing operation, the lower plate 3 is retracted through the mouth, toward the inside of the box structure 7, under the flap 5. The stud 72 passes back into the housing 73. At the end of the translational movement, the stud 72 pulls the flap 5 into a closed and locked position. In one variant, the latch 70 comprises the stud 72 and the pusher 71 is omitted.

In the example described here, the latch also comprises a cam 74. The cam 74 has a shape similar to the stud 72 and is disposed close to the stud 72. The cam 74 guides the flap 5 when the latter is close to its rest position. The stud 72 and the cam 74 are in this case in the form of screws. The heads of each of the two screws are tangential. The risk of accidental unscrewing of one or the other is reduced.

When the stud 72 pulls the flap 5 into its closed position, the free end of the flap 5 bears against the bottom 8 of the frame 2. Thus, the weight of the upper plate 4 in the stowed and locked state is transmitted to the frame 2, in this case by way of the flap 5. The lower plate 3 is spared.

The pusher 71 of the latch 70 can also be designed to come into contact with the internal face 5b of the flap 5 during deployment. In other words, at the start of deployment, the pusher 71 pushes against the flap 5 in order to open it. The pusher 71 thus acts as a buffer for the front surfaces 41d of the raised lateral edges 41.

The embodiments described and their variants are provided for the passage of a wheelchair. The device can be adapted to other uses, for example so as to allow the simultaneous crossing of two wheelchairs or the passage of wider rolling vehicles. In this case, not only can the dimensions of the device be adapted, but the device can also comprise a common box structure that houses two or more than two sets of lower and upper plates and flaps. The deployment/stowing of each of these sets can be designed to be dependent on or, by contrast, independent of one another.

In the embodiments described, the wheels or runners of a first member cooperate with corresponding surfaces of a second member. Space permitting, the second member can carry the wheels or the runners while the first member carries the corresponding surfaces.

The device has been described in the installed and functional state. However, the invention also relates to such a device in the state of separate parts, for example in the form of an installation kit comprising a frame, an upper plate, a lower plate, a flap and a locking member that are designed to be assembled together and form an assistance device.

The invention is not limited to the assistance device examples described above, purely by way of example, but encompasses any variants that are conceivable to a person skilled in the art within the scope of the following claims.

The invention claimed is:

1. An assistance device for people with reduced mobility, notably for allowing a wheeled vehicle to pass over an obstacle, comprising:
   a stationary frame,
   a vertically movable upper plate,
   a lower plate that is mounted for translational movement along an inclined axis with respect to the horizontal between a rest position under the upper plate and a deployed position, the lower plate comprising a body and two raised lateral edges that are disposed along planes parallel to said axis, each raised lateral edge comprising an upper surface, the upper plate being supported at least in part on said raised lateral edges, the deployed position of the lower plate mechanically determining the vertical position of the upper plate said raised lateral edges also forming a guide for moving the vehicle onto and aligning it on the lower plate,
   a flap that is mounted so as to pivot mechanically on the upper plate about a substantially horizontal axis perpendicular to the axis of translational movement of the lower plate, said flap being able to pivot between a substantially vertical rest position and a deployed position resting on the lower plate, said flap forming a junction between the lower plate and the upper plate, said flap being pivoted by said raised lateral edges at least over a part of its pivoting travel, and
   a mechanical member for locking the flap in the rest position, said mechanical locking member being supported on said raised lateral edges and being passive with respect to said raised lateral edges, locking said flap in the rest position of the lower plate and releasing said flap when said lower plate leaves its rest position.

2. The device as claimed in claim 1, wherein the lower plate is connected to a motor that drives a pinion engaged with a rack fastened to the frame.

3. The device as claimed in claim 1, which comprises a crosspiece that rests on rails of the frame by way of sliding guides, said crosspiece being connected to the lower plate by ball joints, said crosspiece bearing a motor that is able to move the lower plate.

4. The device as claimed in claim 1, wherein a part of the body and each raised lateral edge of the lower plate are made of a single piece of folded sheet metal and the lower plate comprises at least one gusset plate fastened to a lower face of the body.

5. The device as claimed in claim 1, wherein the body of the lower plate comprises two substantially equivalent parts, each being connected to a raised lateral edge and being capable of a relative offset.

6. The device as claimed in claim 1, wherein the lower plate has a lower face provided with a wheel that is intended to press against the ground surface in the vicinity of the deployed position.

7. The device as claimed in claim 1, wherein the raised lateral edges slide under the flap during the translational movement of the lower plate, the flap comprising a lower face that is able to come into contact with a pusher of the lower plate and is able to come into contact with the raised lateral edges.

8. The device as claimed in claim 1, wherein, in the rest position, the flap takes up at least a part of the weight from the upper plate and transmits said weight to the frame.

9. The device as claimed in claim 1, wherein the upper plate is supported at least in part on the raised lateral edges by at least one wheel or runner in contact with the upper surface of a raised lateral edge.

10. The device as claimed in claim 9, wherein the upper surface of the raised lateral edge is substantially planar transversely, and wherein the wheel, or the runner, is provided with a planar rolling surface, or a planar sliding surface, respectively.

11. The device as claimed in claim 1, wherein the upper plate is provided with a substantially horizontal pivot pin disposed on the opposite side from the flap.

12. The device as claimed in claim 1, wherein the vertical position of the upper plate is adjustable by two screws.

13. The device as claimed in claim 1, which also comprises a cam that is supported by said raised lateral edges and is passive with respect to said raised lateral edges, said cam guiding the flap when the lower plate leaves its rest position or returns to its rest position, the mechanical member for locking the flap and the cam each comprising a screw, the heads of which are tangential to one another.

* * * * *